United States Patent [19]

Rojas

[11] 4,256,288

[45] Mar. 17, 1981

[54] HOLE CUTTING APPARATUS

[76] Inventor: Miguel E. Rojas, 943 Greatwood, Houston, Tex. 77013

[21] Appl. No.: 63,444

[22] Filed: Aug. 3, 1979

[51] Int. Cl.³ .............................................. B23K 7/10
[52] U.S. Cl. ..................................... 266/70; 266/72; 266/77
[58] Field of Search ....................... 266/58, 70, 71, 72, 266/73, 77

[56] References Cited

U.S. PATENT DOCUMENTS

| | | | |
|---|---|---|---|
| 2,496,110 | 1/1950 | Thurman | 266/58 |
| 2,816,848 | 12/1957 | Maxon | 148/9 |
| 3,351,332 | 11/1967 | Nowell et al. | 266/70 |
| 3,614,078 | 10/1971 | Hepler | 266/70 |
| 3,665,148 | 5/1972 | Yasenchak et al. | 266/58 |
| 3,701,515 | 10/1972 | Field | 266/70 |
| 4,021,025 | 5/1977 | Frame | 266/70 |
| 4,053,145 | 10/1977 | Steele | 266/70 |
| 4,081,179 | 3/1978 | Frame | 266/70 |
| 4,121,808 | 10/1978 | Cardea | 266/58 |

Primary Examiner—L. Dewayne Rutledge
Assistant Examiner—John P. Sheehan
Attorney, Agent, or Firm—Darryl M. Springs

[57] ABSTRACT

In one exemplar embodiment, a portable hole cutting apparatus for cutting circular bolt holes in metal plate and the like is disclosed having a base, and a generally upright frame to which is attached a yoke carrying a pair of vertically spaced-apart bearings mounted for rotation in the yoke, and a vertically oriented elongated drive tube journaled for rotation in the bearings. A drive means such as a manual crank, or an electric, hydraulic or pneumatic motor is mounted on the frame and through a reduction gearbox and a chain or belt driving means drives a sprocket or pulley mounted on the top end of the drive tube by means of a chain or belt. Attached to the lower end of the rotatable drive tube is a bracket that rotates with the drive tube. A cutting torch is mounted on a holding bar which is slideably attached to the bracket for permitting the cutting torch to be positioned laterally for varying the radius of the circular holes to be cut. A circle center marking rod is disposed concentrically through the drive tube and cooperates therewith for permitting the marking rod to be lowered to mark the center of the circle to be cut, and to be raised to a position not interfering with the torch during the circle cutting process.

17 Claims, 9 Drawing Figures

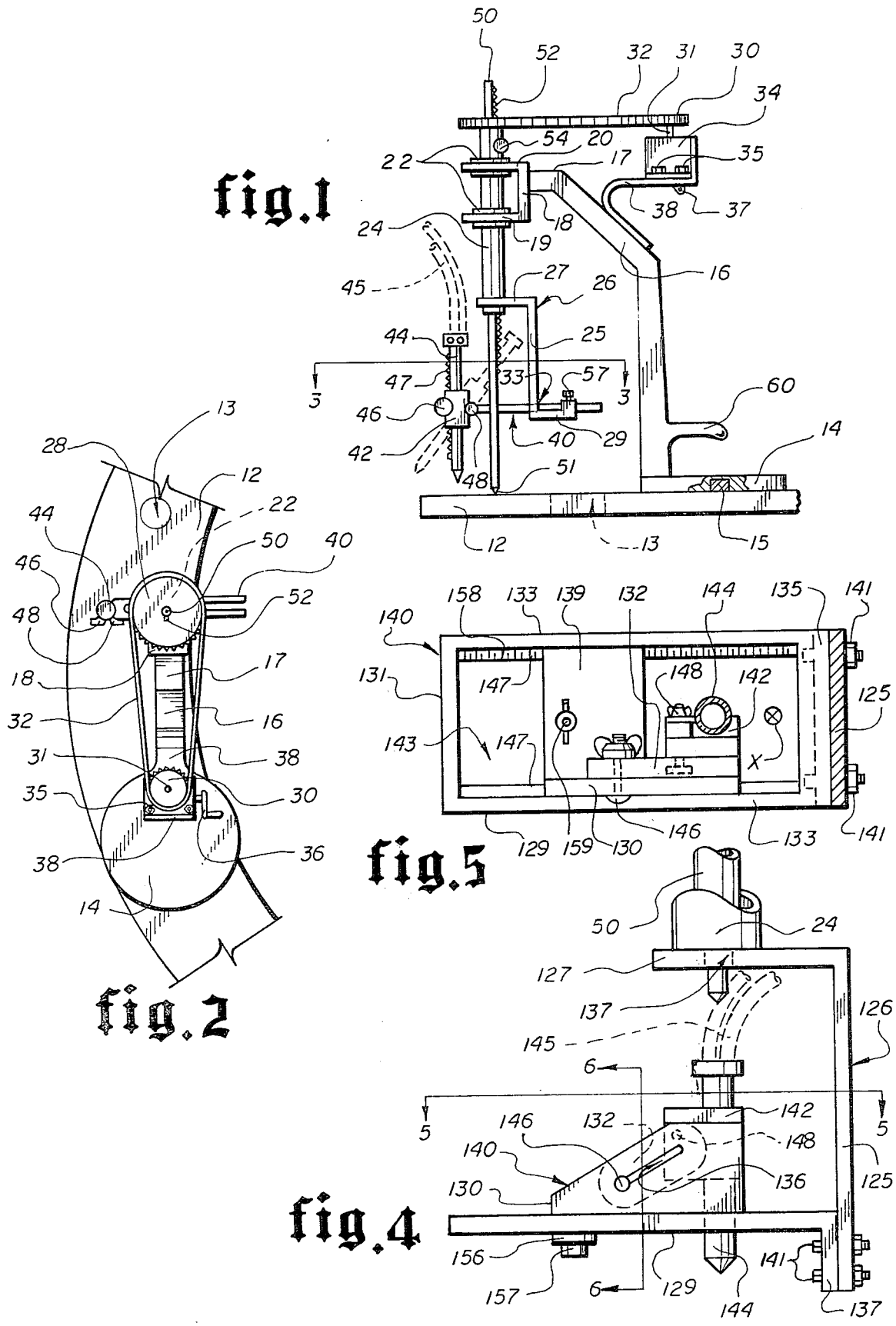

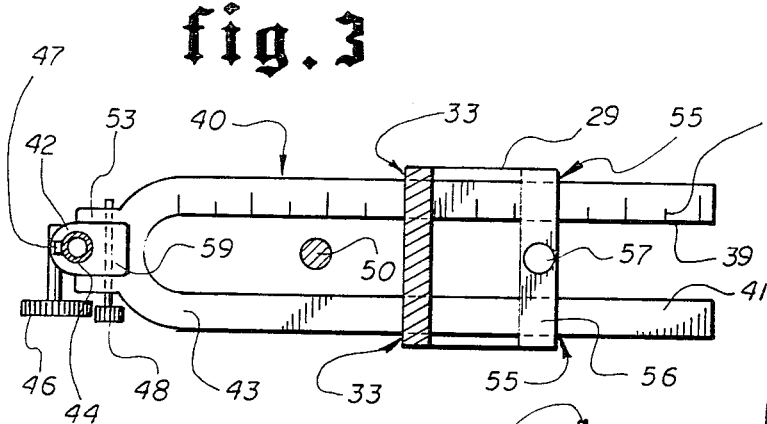
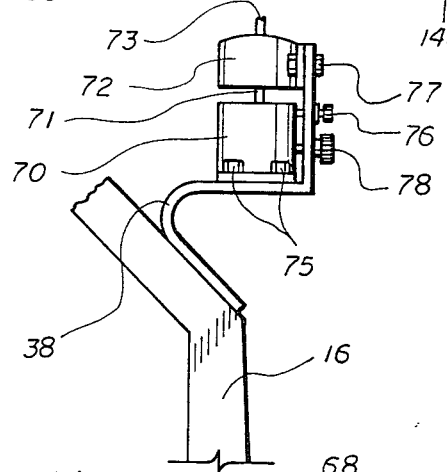
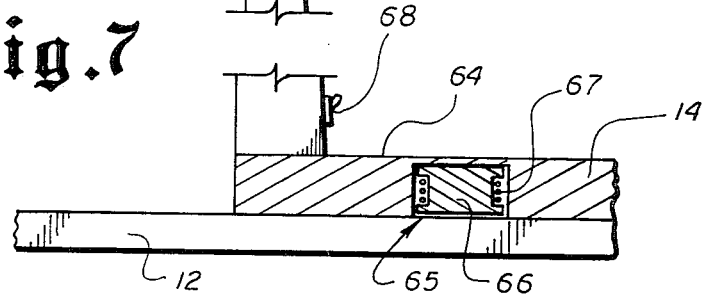
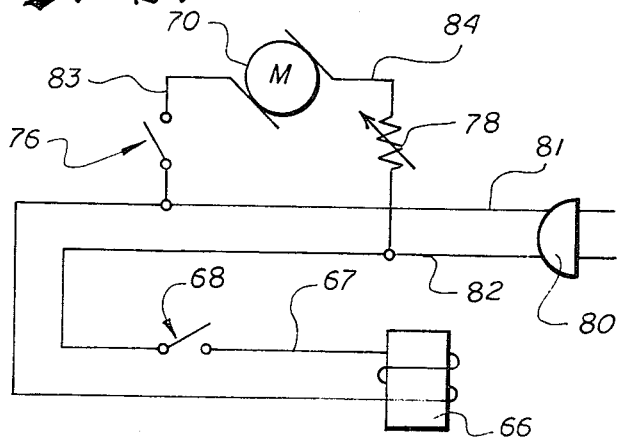
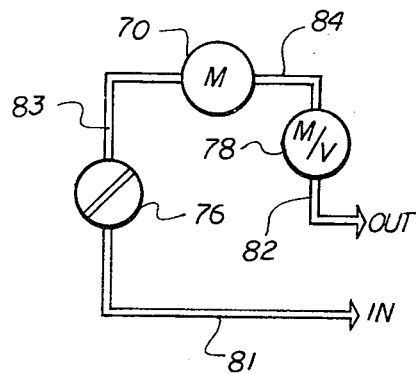

HOLE CUTTING APPARATUS

BACKGROUND OF THE INVENTION

This invention relates to circle cutting apparatus, and more particularly, to an apparatus for supporting a cutting torch for accurately cutting circular bolt holes in metal plate or the like.

In the construction of metal boilers and other pressure vessels for the use in the petro-chemical and refining industry and in other industries requiring large pressure vessels it is necessary to cut small circular holes in the heavy metal plate that forms the base rings of such vessels. The base ring flanges of such boilers or pressure vessels may be four inches to one foot in width, most commonly being on the order of 4–6 inches wide. Often the material is metal plate that may vary anywhere from ⅜ to 4 inches thick. The holes in the base ring flanges are for mounting bolts to mount the pressure vessel or boiler to a suitable structure or base. Such mounting bolt holes are typically 1½ to 2½ inches in diameter, although they may occasionally be smaller, and sometimes it is necessary that they be of a larger diameter. On occasion the holes must be beveled to meet construction requirements. These flange rings may be anywhere from a few feet to 10 or 12 feet in diameter and because of the large size and weight of the flanges, it is difficult to drill bolt holes of the size required through the flanges since twist drill machines to accomodate such diameter holes are not commonly portable, and it is difficult or sometimes impossible to take a large flange ring to a stationary drill press that can drill the desired size holes.

Accordingly, in the past it has been common to cut such bolt holes manually by using an acetylene torch. There are disadvantages to manually cutting such bolt holes by hand with a torch, however, since it takes a great deal of developed skill for a torch operator to be able to cut a smooth and perpendicular bolt hole, and the smaller the diameter of the hole the more difficult it is to cut a smooth bolt hole. Any slight angle between the torch and plate will result in an undesirable beveled hole. Further, the speed at which the circular bolt hole is to be cut varies depending on the composition of the metal plate and its thickness, and it is difficult for an operator to be consistent in his cutting speed and circular motion from bolt hole to bolt hole. In addition, often the bolt hole cuts are so rough that they must be further machined and polished and touched up with the torch, or in some cases the tolerances are out of specification, and the flange cannot be utilized. All of this leads to a great waste of time by the torch operator, and a loss in labor and materials due to the non-uniformity of the bolt holes cut in the flanges and the wasting of material for non-acceptable jobs.

The prior art includes many torch cutting machines for cutting intricate shapes and designs in metal plate, these torch machines often being controlled by a computer or a numerically controlled machine that can cut large intricate patterns. Such prior art is exemplified by the following U.S. Pat. Nos.: 4,121,808 (Cardea); 3,665,148 (Yasenchak et al.); 3,614,078 (Hepkr); 2,816,848 (Maxon); and 2,496,110 (Thurman). In addition, U.S. Pat. No. 4,053,145 (Steele) discloses a cutting torch guide for providing means for effecting circular cutouts in large vessels or large diameter pipe without the need of a lay-out other than fixing a working point and providing multiple adjustments so the cuts may be made of the desired diameter as well as having the desired bevel. The cutting torch guide utilizes a center shaft for marking the center of the area to be cut on the curved surface of such large vessels or large diameter pipe. However, the disclosed apparatus, while certainly utilizable to cut circular cutouts in the side of a large diameter vessel or pipe is not suitable for cutting rather small diameter holes in flange rings or other members.

U.S. Pat. No. 4,021,025 (Frame) discloses a circle cutting apparatus particularly adaptable for the cutting of circles and arcs in metal plate with a cutting torch. The device comprises a circular platform which is attached to the plate to be cut and a torch or cutting implement which is radially adjustable with respect to the platform, the cutting apparatus also being movable in a circular path with respect to the platform. The disclosed device is suitable for cutting rather large diameter circles, and while it may be possible to cut rather small diameter circles with the device, its size and construction, demanding a large circular platform and mounting area, would render it useless for use in cutting small circular bolt holes on rather narrow flange rims.

Accordingly, one primary feature of the present invention is to provide a portable hole cutting apparatus for cutting circular holes in metal plate such as narrow flange rims.

Another feature of the present invention is to provide a circle center marking means to locate the exact center of the circular bolt hole to be cut to aid in positioning the portable apparatus.

Yet another feature of the present invention is to provide a torch holding bracket that is transversely adjustable for varying the radius of the selected bolt hole to be cut by the torch.

Still another feature of the present invention is to provide drive means that can vary the speed of rotation of the torch during the cutting process.

Yet another feature of the present invention is to provide a bolt hole cutting apparatus that will consistently cut straight, smooth holes in metal plate.

Still another feature of the present invention is to provide a bolt hole cutting apparatus that can cut beveled holes in metal plate at a consistent desired angle of bevel.

SUMMARY OF THE INVENTION

The present invention remedies the problems of the prior art by providing a portable hole cutting apparatus for cutting circular bolt holes in metal plate or the like having a base, a generally upright frame attached to the base and having an upper laterally extending portion, a yoke mounted on the extremity of the laterally extending portion of the frame, the yoke carrying a suitable bearing arrangement mounted for rotation in the yoke. A vertically oriented elongated drive tube is journaled for rotation in the bearing, and a drive means mounted on the frame cooperates with a sprocket or pulley mounted on the upper end of the drive tube for rotatably turning the drive tube at a desired rotational speed. The lower end of the rotatable drive tube carries a bracket that rotates with the drive tube and cooperates with a cutting torch and torch holding bar for rotating the torch in response to rotation of the drive tube. The torch holding bar cooperates with the bracket for adjusting the radius of the circular hole cut by the torch. A circle center marking rod is concentrically disposed through the drive tube and cooperates therewith for at least limited vertical movement through the drive tube. The rod is movable to a lower position to enable the lower rod tip to engage the surface of the metal plate for marking the center of the hole to cut, and then movable to a raised position while the hole is being cut by the torch.

The drive means for turning the rotatable tube may be a hand crank driving a drive sprocket or pulley and connected to the tube sprocket or pulley by a means of a chain or belt, or an electric motor or a hydraulic or pneumatic motor may be substituted for the manual hand crank in driving the reduction gearbox. Permanent magnets and/or an energizable electromagnet may be disposed in the base of the hole cutting device for aiding in gripping the metal plate during the hole cutting operation. Further, means are provided for limited vertical movement of the torch to adjust the cutting height of the torch tip above the work surface, and means are also provided for pivoting the cutting torch with respect to the torch holding bar in order that beveled circular cuts may be made if desired.

BRIEF DESCRIPTIONS OF THE DRAWINGS

In order that the manner in which the above-recited advantages and features of the invention are attained can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope for the invention may admit to further equally effective embodiments.

In the drawings:

FIG. 1 is a side elevational view of the hole cutting apparatus according to this invention.

FIG. 2 is a top view of the hole cutting apparatus according to the present invention.

FIG. 3 is a detailed plan view of the apparatus shown in FIGS. 1 and 2 taken along lines 3—3 of FIG. 1.

FIG. 4 is a partial detailed side view of a second embodiment of the cutting torch holding bar means.

FIG. 5 is a detailed plan view of the apparatus shown in FIG. 4 taken along lines 5—5 of FIG. 4.

FIG. 6 is a detailed vertical cross-sectional view of the apparatus shown in FIG. 4 taken along lines 6—6 of FIG. 4.

FIG. 7 is a fragmentary side view of a second embodiment of the hole cutting apparatus according to the present invention.

FIG. 8A is an electrical schematic for use with one embodiment of the present invention.

FIG. 8B is a motor control schematic for use with yet another embodiment of the present invention utilizing either a pneumatic or hydraulic drive motor.

DETAILED DESCRIPTION OF THE PREFERRED EMBODIMENTS

Referring now to FIGS. 1 and 2, the portable hole cutting apparatus 10 for cutting circular holes in metal plate or the like is shown. While the description herein is made with respect to metal plate, it is to be understood that the described apparatus may be used for cutting other materials as well. Hole cutting apparatus 10 has a weighted base 14 that sits on the upper surface of the metal plate or flange rim 12 which holes 13 are to be cut. Base 14 must be of sufficient size, weight and configuration such that it will support the remainder of the apparatus and the cutting torch without danger of tipping or tilting over. Further, the base must be of sufficient mass and weight to maintain apparatus 10 in a steady secure position once the torch cutting procedure has begun. If desired, a permanent magnet 15 may be removably attached in a cavity in base member 14 to provide additional holding force for the base to the plate 12 work surface. If needed, a plurality of such magnets may be utilized.

Attached adjacent the forward edge of base 14 is a generally upright frame member 16 having an upper laterally extending portion or section 17. Attached to the end of extending portion 17 is a yoke 18 that has a pair of spaced parallel horizontally extending arms or flanges 19 and 20. One each of a pair of bearing races 22 are mounted for rotation in each of said yoke flanges 19 and 20, the pair of bearings 22 being vertically spaced in axial alignment. A drive tube member 24 is journaled for rotation in the bearings 22 and has an upper portion extending above the upper bearing 22 and a lower tube portion extending below the lower bearing 22. Fixed to the upper or top end of tube member 24 is a large sprocket or pulley 28, having an aperture axially disposed therein for permitting the passage therethrough of the circle center marking rod 50 which will be hereinafter further described.

Centrally located and mounted on frame 16 is a mounting bracket 38 that has attached thereto a gearbox 34 having an input shaft 37 and an output drive shaft 31. Gearbox 34 is attached to mounting bracket 38 by means of conventional fastener such as bolts 35. Attached to the end of drive shaft 31 is a drive sprocket 30 that is horizontally spaced from the hereinabove described tube sprocket 28. A circular motion translating means, such as a chain or belt 32 connects the sprockets or pulleys 28 and 30 for transmitting circular motion from the drive sprocket or pulley 30 to the tube driven sprocket or pulley 28. Attached to the input shaft 37 of gearbox 34 is a manual crank handle 36 that permits the operator of the hole cutting apparatus to manually drive the tube member 24 in a circular motion for the purposes to be hereinafter further described. Attached near base 14 on the frame member 16 is a handle 60 that permits the operator to readily lift and/or carry the machine 10 and move it to another location, thereby making the apparatus portable and easily moved from one location to another.

Referring now to FIGS. 1, 2, and 3, a cutting torch bracket means 26 is shown, having a generally Z-shaped configuration and rigidly attached to the lower end of tube member 24. The Z-shaped bracket means comprises a vertically oriented center riser section 25 and a first laterally extending arm or section 27 that is fixed to the bottom end of tube member 24. Extending section 27 has an aperture 37 disposed therein in registration with the inner opening through tube member 24 for permitting the passage therethrough of the circle center marking rod 50 as will be hereinafter further described. The other end of the riser section 25 ends in a second laterally extending arm section 29 that is oriented parallel to the work surface such as metal plate or flange rim 12. Riser section 25 has a horizontal slot or aperture 33 disposed therein adjacent the upper surface of the second extending section 29 for purposes that will be hereinafter further described. Mounted adjacent the free extending end of section 29 is a clamp bracket 56 and a clamp bracket operating knob 57. A cutting torch holding means 40 is shown extending through slot 33 of riser section 25 and passing through and engaging the clamp bracket 56. The holding bar means 40 can be moved transversely through slot 33 and clamp bracket 56 to adjust the radius of the circular hole cut by torch 44 as will be hereinafter further described.

The torch holding means 40 further includes a collar 42 that concentrically accepts a cutting torch 44 to extend therethrough and cooperates with collar 42 for permitting the cutting torch 44 limited vertical movement therethrough. Gas lines or hoses 45 provide the oxygen and acetylene gas for operation of cutting torch 44. The cutting torch tip body 44 has disposed thereon a rack gear 47 which engages an internal pinion gear (not shown) within collar 42, the pinion gear being connected to an external operating knob 46 for permitting the machine operator to rotate knob 46 thus raising and lowering the cutting torch 44 vertically within collar 42 to a desired height. Further, a bevel adjustment or locking knob 48 permits collar 42 to pivot through a limited degree of travel with respect to bar means 40 to pivot the cutting torch 44 at a desired angle for cutting beveled holes in the metal plate 12. Such a pivoted position of the torch 44 and collar 42 are shown by the dotted lines in FIGS. 1 and 3.

Referring now to FIGS. 1 and 3, the description of the torch holding bar means 40 will be described in more detail. Holding bar means 40 comprises a generally U-shaped forked bar having a closed end 43 and a pair of spaced, parallel extending arms 39 and 41. The spaced arms 39 and 41 are inserted through slot or opening 33 in riser section 25 of bracket means 26, the extending arms 39 and 41 further protruding through slots 55 in clamping bracket 56 and beyond the lateral end of the second bracket arm section 29. When the clamping knob or nut 57 is moved to a locked position, the clamp 56 engages the extending arms 39 and 41 of bar means 40 for locking bar means 40 in a desired extended position. The closed end 43 of bar means 40 ends in a pair of laterally extending flanges or ears 53 having disposed therethrough axially aligned apertures. One side of collar 42 has a projecting shoulder 59 that fits tightly and snugly between the extending ears or flanges 53 of bar means 40 and has disposed transversely therethrough an aperture that is in axial alignment with the spaced apertures in flanges 53. A pivot pin 49 is inserted through the aligned apertures in flanges 53 and shoulder 59 to permit limited pivotal movement of collar 42 (carrying cutting torch 44) with respect to bar means 40. An external bevel adjustment and locking knob 48 is attached to pivot pin 49 to enable collar 42 to be locked in a desired angular relationship with respect to bar means 40. At least one of the legs 39 or 41 of bar means 40 may be marked with a suitable indicia 58 cooperating with riser section 25 or arm 29 for directly indicating the length of the radius of the hole that is to be cut by the cutting torch 44. The legs 39 and 41 are spaced sufficiently to permit the circle center marking rod 50 to pass therebetween as shown in FIG. 3.

The circle center marking rod 50 is a cylindrical rod adapted for limited vertical movement within the vertically oriented tube member 24. The lower tip 51 of rod 50 is tapered to a point for marking the exact center of the circular bolt hole that is desired to be cut. In operation, the circle center marking rod is lowered and the apparatus 10 is positioned until the tip 51 touches the upper surface of plate 12 at the exact marked center of the hole 13 to be cut. The torch holding bar means 40 is then adjusted with respect to the vertical center line through the marking rod 50 and the circular hole to be cut for positioning the cutting torch 44 to the desired radius from the center line of the hole to be cut in plate 12 (See FIG. 1). The cutting torch 44 can then be adjusted vertically to the desired cutting height depending on the thickness and other characteristics of the material. Once the correct radius and cutting torch height have been established the circle center marking rod 50 may then be lifted to a raised position, and then the crank handle 36 can be turned at the desired rate of speed for rotating tube 24 and cutting torch 44 to cut the desired circular hole. With the torch 44 oriented perpendicular to the surface of plate 12, a straight perpendicular cut will be effected through plate 12.

A means of readily raising and lowering the circle center marking rod 50 is provided and consists of a rack gear 52 disposed along one longitudinal edge of rod 50, an internal pinion gear (not shown) disposed with the upper portion of the tube member 24 for engaging the rack gear 52, the pinion gear being rotatable by an external operating knob 54, thus allowing the operator to raise and lower the marking rod 50 by the operation of the pinion gear knob 54. Of course, other means of raising and lowering the marking rod 50 and retaining it in any desired raised or lowered position may be utilized.

Referring now to FIGS. 4–6, a second embodiment of a cutting torch bracket means is shown. Bracket 126 has a generally inverted L-shaped configuration and is rigidly attached to the lower end of tube member 24. The L-shaped bracket means comprises a vertically oriented riser section 125 and a first laterally extending arm or section 127 that is fixed to the bottom end of tube member 24. Extending section 127 has an aperture 137 disposed therein in registration with the inner opening through tube member 24 for permitting the passage therethrough of the circle center marking rod 50 as hereinabove described. Removably attached to the other end of riser section 125 is a laterally extending torch holding bar means 140 supported on a bracket or frame member 129 that is oriented parallel to the work surface such as metal plate or flange rim 12 (see FIG. 1). Frame 129 has a flange portion 137 that contacts the lower end of bracket riser portion 125 and is removably attached thereto by bolt and nut combinations 141.

Frame 129 is a rectangular-shaped section having a rectangular-shaped opening 143 disposed therein defined by extending end 131 and interior end 135 and opposing longitudinal sides 133. Projecting inwardly of sides 133 are a pair of parallel shoulders or "rails" 147 for providing a "track" for longitudinal movement of torch holding means 140.

Torch holding means 140 includes a base plate 139 sized to cooperate with bracket or frame 129 for longitudinal sliding movement between parallel sides 133 upon rails 147. A clamping bar 156 is disposed transversely across spaced sides 133 and contact the lower surfaces thereof. A bolt 157 and nut 159 pass through bar 156 and plate 139 for adjustably clamping plate 139 in a desired longitudinal position along rails 147. Positioning indicia 158 are disposed on at least one rail 147 surface to position torch 144 with respect to the axial centerline of marking rod 50 as shown at "X" in FIG. 5. Extending perpendicularly upward from base plate 139 is a generally triangular mounting member 130 having an angularly disposed slot 136 disposed therein. An elongated link member 132 is disposed inwardly of mounting member 130 and attached thereto by means of bolt 146 and nut 147 through one end of link member 132. Bolt 146 passes through slot 136 and when nut 147 is loosened, link 132 and bolt and nut fastener 146, 147 may be moved upwardly and downwardly in the inclined slot 136 for purposes to be hereinafter further described.

A torch holding bar or bracket 142 holds torch 144 by suitable means such as clamps, brackets, brazing or the like, to permit the cutting torch 144 to depend through opening 143 toward the work piece (not shown). Torch holding bar 142 is attached to the other end of link member 132 by means of bolt-nut combination 148. With bolt and nut combination 146, 147 tightened to hold link member 132 rigid with respect to plate 130, torch 144 and bracket 142 may be rotatably moved and positioned with respect to the other end of link member 132 by means of bolt-nut combination 148 for tilting torch 144 for cutting beveled holes. Manipulating link member 132 and torch bracket 142 with respect to member 130 allows torch 144 to be raised, lowered and tilted to variable angles with respect to the work piece (not shown). To enable torch 144 to reach closely adjacent extending end 131, bolt 157 and nut 159 may be removed to reverse the position of base plate 139 and then clamping bar 156 is again attached to hold plate 139 carrying torch 144 in a reversed position. If a longer circle radius desired, other frame member 129 with longer longitudinal sides 133 may be used.

While the simplest embodiment of apparatus 10 as shown in FIGS. 1-6, utilizes a manually cranked gear box for driving tube member 24 and the attached cutting torch 44, it may be desirable for other embodiments to utilize an electric, hydraulic or pneumatic drive motor. In addition, under certain conditions, base 14 may be made smaller and narrower, particularly if work on narrow flange rims will not accommodate the size and weight of the pictured base 14.

Accordingly, referring now to FIGS. 7 and 8, other embodiments of the portable hole cutting apparatus are shown. In FIG. 7, the base 64 is shown having at least one cavity 65 disposed therein and communicating with the lower surface of base 64 that ordinarily makes direct contact with the surface of plate 12 in which the bolt holes are to be cut. Disposed in cavity 65 may be a permanent magnet as hereinabove described, or preferably an electromagnet having a core member 66 and a magnetic winding 67, the lower face of core 66 being positioned such that it will contact the upper exposed surface of metal plate 12 for contacting and electromagnetically gripping plate 12 when the electromagnet is energized. Of course, a plurality of such electromagnets could be used, but normally one such electromagnetic generally should suffice. The use of the electromagnets to exert a gripping force on the metal plate to be cut permits the base 64 to be made narrower and lighter such that base 64 does not have to offset the weight of apparatus 10 and the forces generated by the drive apparatus. A suitable switch 68 is shown positioned on frame member 16 for energizing and de-energizing the holding electromagnetic.

In addition, mounting bracket 38 attached to frame 16 is shown supporting a motor 70 which is attached to mounting bracket 38 by means of a conventional fasteners such as bolts 75 and having an output drive shaft 71. Motor 70 may further have a motor switch or control knob 76 for energizing or de-energizing motor 70, and a control device 78 for controlling the speed of motor 70.

If motor 70 is an electric motor, knob 76 would control a switch for energizing or de-energizing the electric motor 70 and the knob 78 would control a potentiometer in the electric circuit for varying the electrical potential applied to motor 70 and thereby controlling its speed. In a hydraulic or pneumatic system motor 70 would be either a hydraulic or pneumatic motor, and knob 76 would control a valve for energizing motor 70, while knob 78 would control a metering valve for controlling the flow of pressurized fluid, hydraulic or compressed air, through motor 70 and thereby determine its drive speed. The output drive shaft 71 of motor 70 is connected as an input to a reducing gearbox 72 having an output drive shaft 73 attached to a drive sprocket or pulley 30 (not shown) as hereinabove described (See FIGS. 1 and 2). The gearbox 72 could be conventionally mounted on bracket 38 by means of conventional fasteners such as a bolt and nut arrangement 77.

In FIG. 8A, a simplified circuit schematic of an electrical hole cutting apparatus 10 is shown. A plug 80 is provided for mating with a source of electrical power (not shown) and has a pair of conductors 81 and 82 in a cable extending therefrom. Conductor 82 is connected to one side of switch 68, the other side of switch 68 being connected to one terminal of the electromagnet winding 67. The other end of the electromagnet winding 67, shown wrapping core 66, is connected back to conductor 81 to complete the circuit. When switch 68 is closed, electrical power through plug 80 and conductors 81 and 82 energize coil 67 to create a magnetic field in core 66 for attracting and gripping the surface of plate 12 as hereinabove described in FIG. 7. In addition, conductor 81 is connected to one side of switch 76, the other side of which is connected through conductor 83 to electric motor 70. The other conductor 82 is attached through a variable resister or potentiometer 78 through conductor 84 to complete the circuit through the electric motor 70. When switch 76 is closed, motor 70 is energized and the speed of motor 70 may be controlled by varying the resistance in the circuit by means of the variable resister or potentiometer 78.

FIG. 8B shows a variation of the circuitry where motor 70 may be a hydraulic or pneumatic motor, while the electromagnet would continue to utilize plug 80, conductors 81 and 82, and switch 68. In the circuit configuration of FIG. 8B, a simplified hydraulic or pneumatic schematic is shown with hydraulic fluid or compressed air being applied in through pipe or tubing 81' and through a shutoff valve 76' and thence through piping or tubing 83' to the hydraulic or pneumatic motor 70'. The output of the motor 70' is connected via tubing 84' through a metering valve 78' to tubing 82' and out to the source of hydraulic or pneumatic fluid. The control valve 76' would energize or de-energize motor 70', while the metering valve 78' would control the amount of fluid being returned through line or tubing 84' and 82', thereby controlling the speed of the hydraulic or pneumatic motor 70'.

Numerous variations and modifications may be made in the structure herein described without departing from the present invention. Accordingly, it should be clearly understood that the forms of the invention herein described and shown in the figures of the accompanying drawings are illustrative only and are not intended to limit the scope of the invention.

What is claimed is:

1. A portable hole cutting apparatus for cutting circular holes in flat metal plate, comprising a weighted base having a generally flat bottom surface for mounting on the plate, a generally upright frame attached to said base and housing an upper laterally extending portion, a generally U-shaped yoke housing a pair of vertically spaced extending horizontal yoke bracket flanges, each one of said pair of vertically spaced yoke flanges having a circular aperture disposed therein vertically registering with said aperture in the other one of said yoke flanges, a pair of circular bearings one of which is disposed for rotation in each of said yoke flanges adjacent said vertically aligned apertures, an elongated drive tube vertically disposed in said yoke bracket apertures and journaled for rotation in said bearings, drive means mounted on said frame and connected to said drive tube for rotating said drive tube at a desired rotational speed, a cutting torch, torch holding bar means adapted for carrying said torch, a drive bracket including a short horizontal end rigidly attached to the lower end of said drive tube, said bracket including a portion of the lower end of which includes mounting means for mounting said torch holding bar means in a horizontal relationship to the metal plate, said drive bracket rotating said torch holding bar means and said cutting torch in response to rotation of said drive tube, said torch holding bar means cooperating with said drive bracket for permitting horizontal movement of said cutting torch with respect to said drive bracket for adjusting the radius of the circle scribed by said cutting torch, and a circle center marking rod concentrically disposed through said drive tube and cooperating therewith for at least limited vertical movement therethrough, said rod movable to a lower position to engage the surface of the metal plate for marking the center of the hole to be cut, and movable to a raised position while the hole is being cut by said torch.

2. The apparatus as described in claim 1, wherein said drive means comprises a mounting bracket attached to said frame, a gearbox mounted on said mounted bracket and having an output drive shaft and an input shaft, a rotatable drive member horizontally mounted on said gearbox drive shaft, a rotable driven member horizontally spaced from said drive member and mounted adjacent the upper end of said tube member, a drive translation means connecting said drive member and said driven member for rotating said tube in response to rotation of said drive member, and driving means for turning said gearbox input shaft.

3. The apparatus as described in claim 2, wherein said rotatable drive member and said rotatable driven member are circular sprockets, and wherein said drive translation means comprises a drive chain connecting and engaging said sprockets.

4. The apparatus as described in claim 2, wherein said driving means comprises a manually driven crank handle.

5. The apparatus as described in claim 2, wherein said driving means comprises an electric motor.

6. The apparatus as described in claim 2, wherein said driving means comprises a hydraulic motor.

7. The apparatus as described in claim 2, wherein said driving means comprises a pneumatic motor.

8. The apparatus as described in claim 1, wherein said torch holding bar means comprises a forked bar having a pair of spaced parallel extending arms and a closed end, said parallel arms spaced to permit the passage of said circle center marking rod therebetween, and a collar attached to said closed end of said forked bar for receiving said cutting torch and cooperating therewith to permit said cutting torch limited vertical movement with respect to said collar, said pair of extending arms cooperating with said drive bracket for permitting limited horizontal movement of said bar and said attached cutting torch for adjusting the radius of the circular hole cut by said torch.

9. The apparatus as described in claim 1, wherein said torch holding bar means comprises an elongated frame member with a central longitudinal opening therethrough and having an extending flange adapted for attachment to said drive bracket, and a pair of spaced parallel rails adjacent opposite sides of said opening, and torch holding means adapted for cooperation with said spaced rails of said frame member for longitudinal movement there along for horizontal positioning of said torch, said means further including adjusting means for raising and lowering said torch and positioning said torch through limited arcuate travel for cutting beveled holes.

10. The apparatus as described in claim 9, wherein said torch holding means comprises a base section adapted for transverse positioning across said spaced rails and opening of said frame member and cooperating therewith for longitudinal sliding movement therealong, said base section further having an extending mounting member projecting vertically upwardly and to one side of said base section, said mounting member carrying an elongated slot therethrough disposed at an angle to the horizontal;

a clamping bar adapted for transverse positioning across the bottom of said frame member adjustable fastening means interconnecting said base section and clamping bar for permitting selected positioning of said base and clamping bar longitudinally of said frame member, a torch holding bar adapted for removable attachment to said cutting torch and spaced from said base mounting member, a flat elongated link member disposed between said torch holding bar and said extending mounting member, said link member having an aperture therethrough disposed adjacent each end, a first shaft means disposed through one of said apertures in said link member and through said slot in said mounting member for permitting at least limited rotational movement of said one end of said link with respect to said mounting member, a second shaft means disposed through said other aperture in the other end of said link member and cooperating with an aperture disposed in said torch holding bar for permitting at least limited rotational movement of said torch holding bar and said other end of said link member, said first shaft means adapted for adjustable slidable movement in said slot disposed in said mounting member to raise or lower said attached link member and torch holding bar.

11. The apparatus as described in claim 1, wherein said circle center marking rod has a rack gear disposed thereon, and wherein said upper portion of said drive tube member further includes an internal pinion gear engaging said rack gear, and an external operating knob cooperating with said pinion gear for permitting limited vertical movement of said rod through said drive tube.

12. The apparatus as described in claim 1, further including
an electromagnet disposed in a recess in said base, one face of said electromagnet being in substantial alignment with the bottom surface of said base for contacting and gripping the metal plate when energized,
circuit means for connecting said electromagnet to a source of electrical power, and
a switch disposed in said circuit means for selectively energizing said electromagnet.

13. The apparatus as described in claims 5 or 6 or 7, further including control means for energizing said motor and selectively controlling said motor speed.

14. The apparatus as described in claim 1, further including a handle mounted on said frame for lifting said apparatus from the metal plate.

15. The apparatus as described in claim 8, wherein at least one of said extending arms of said forked bar carries indicia cooperating with said drive bracket for indicating the dimension of the radius of the circular hole to be cut by said torch.

16. The apparatus as described in claim 9, wherein at least one of said rails of said frame member carries indicia cooperating with said torch holding means for indicating the dimension of the radius of the circular hole to be cut by said torch.

17. The apparatus as described in claim 1, further including
a permanent magnet disposed in a recess in said base, one face of said permanent magnet being in substantial alignment with the bottom surface of said base for contacting and gripping the metal plate.

* * * * *